United States Patent
Harden

[15] 3,683,547
[45] Aug. 15, 1972

[54] SELF-CENTERING SPRAYING APPARATUS

[72] Inventor: Kendall L. Harden, Anderson Township, Hamilton County, Ohio

[73] Assignee: The Procter & Gamble Company, Cincinnati, Ohio

[22] Filed: Feb. 11, 1971

[21] Appl. No.: 114,554

[52] U.S. Cl. .................... 47/1.7, 239/146, 118/323, 56/DIG. 15
[51] Int. Cl. .............................................. A01g 25/00
[58] Field of Search ............. 47/1.7; 118/8, 305, 323; 15/77, DIG. 2; 239/104, 120–122, 146, 149–150, 159, 162, 172; 56/DIG. 15

[56] References Cited

UNITED STATES PATENTS

| 1,188,131 | 6/1916 | Agee | 239/150 |
| 1,543,021 | 6/1925 | McArthur | 47/1.7 |
| 2,301,213 | 11/1942 | Kang | 47/1.7 X |
| 2,966,880 | 1/1961 | Gengenbach et al. | 118/8 |
| 3,412,938 | 11/1968 | Larson | 239/172 |
| 3,445,961 | 5/1969 | Elsworth | 47/1.7 |

FOREIGN PATENTS OR APPLICATIONS 837,328   2/1939   France

Primary Examiner—Robert E. Bagwill
Attorney—Fredrick H. Braun, John V. Orman and Richard C. Witte

[57] ABSTRACT

An improved crop spraying apparatus, particularly adapted for spraying tobacco plants, is suspended for lateral movement from the boom of a self propelled mobil sprayer having a built-in tank and pump for supplying a spray nozzle on the spraying apparatus. The spraying apparatus is suspended from the boom by a self-centering linkage which includes oppositely disposed sensing elements, preferably in the form of curved surfaces forming a converging-diverging channel. The sensing elements are designed to contact the leaves on opposite sides of successive plants in a continuous row of tobacco plants. The sensing elements are displaced laterally on contacting a misaligned plant which is translated into lateral movement of the pivoted linkage to center the spray nozzle over the top of each plant in the row so that liquid is sprayed downwardly from the nozzle over the center of the plant stalk.

8 Claims, 13 Drawing Figures

Patented Aug. 15, 1972

INVENTOR.
Kendall L. Harden

BY Fredrick H. Braun
ATTORNEY

Patented Aug. 15, 1972
3,683,547
3 Sheets-Sheet 2
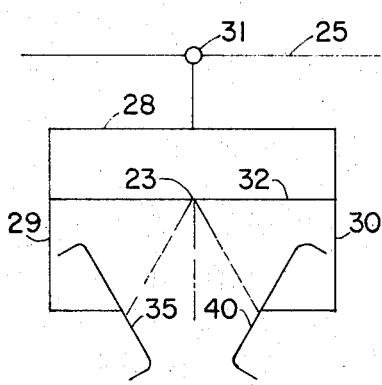
Fig. 5
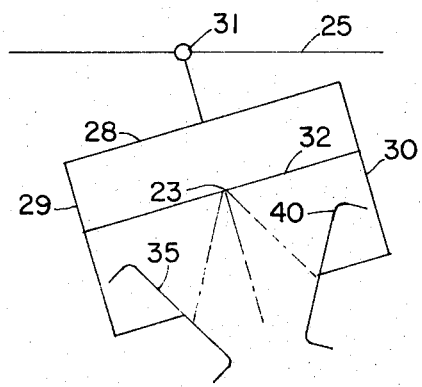
Fig. 6
Fig. 2
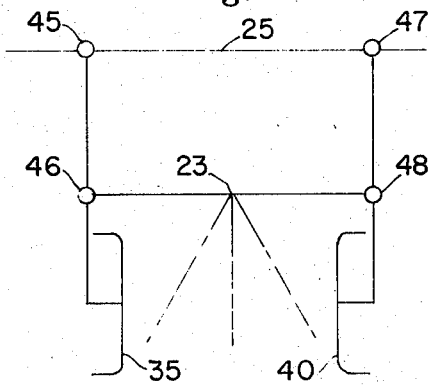
Fig. 7
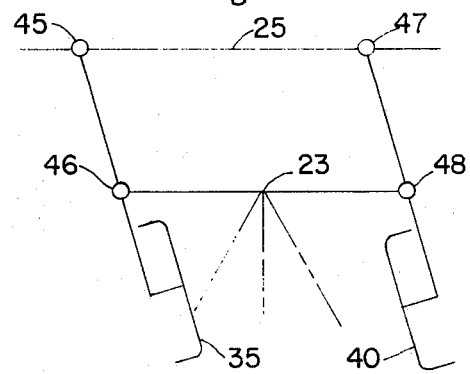
Fig. 8
INVENTOR.
Kendall L. Harden
BY
ATTORNEY Patented Aug. 15, 1972 3,683,547

INVENTOR.
Kendall L. Harden

BY Fredrick H. Braun
ATTORNEY

SELF-CENTERING SPRAYING APPARATUS

BACKGROUND OF THE INVENTION

During their normal growth cycle, tobacco plants sprout suckers or parasitic growths at the base of each leaf or leaf axil as the plant approaches maturity. In order to obtain the most satisfactory tobacco crop, it is a preferred practice to remove the suckers at an early stage of their development. In general, the removal of suckers has been largely a manual operation in the past which is both tedious and very time consuming thus adding to the labor cost of the tobacco crop.

Recent years have seen the introduction of chemical spray agents for tobacco sucker control which may be applied to the leaf axils to kill the suckers without having any adverse effect on the further development of the plant. For example, a liquid spray concentrate under the trademark OFF-SHOOT-T is distributed by The Procter & Gamble Company as a tobacco sucker control agent and has been found to be particularly well suited for controlling both primary and secondary suckers on tobacco. It can be used effectively on various tobaccos including flue cured, burley and dark.

In spite of the introduction of chemical agents for sucker control, there has still been a need for a spraying unit that would reliably spray the sucker control chemical over the center of the plant so that the major portion of the spray would run down the stalk and puddle at each leaf axil of the plant. The problem is intensified by the fact that the plants in a typical row of tobacco are usually misaligned and can, in some cases, be as much as 6 inches off center. While there have been a number of spray units suggested for accomplishing this objective, they have been generally unsatisfactory since they relied on multiple nozzle arrangements with a fixed orientation. Therefore, they wasted about two-thirds of the sprayed chemical. On the other hand, hand-held spraying units have been used but they do not relieve the tedium from the suckering procedure nor do they diminish the time requirement to a significant extent in relation to the added equipment and chemical cost.

Specifically, it is well known to use a power spray unit having three nozzles per row of tobacco, one above and the others angled at about 9 inches on either side. This nozzle arrangement is made necessary to insure that the spray reaches each plant in the row in which misalignment of successive plants is unavoidable. On the other hand, the use of hand-held or knapsack sprayers requires substantial physical labor and plant coverage is directly dependent on the personal care of the operator.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of a reliable self-centering spraying apparatus that uses a minimum of spray chemical to achieve effective total treatment of successive plants.

Another object of the invention is the provision of a spraying apparatus that can be readily used with a conventional self-propelled power spray unit so that the spray is positioned directly over the center of successive plants as the power unit is driven down a row of tobacco in which successive plants are misaligned.

Another object of the invention is the provision of a self-centering spraying apparatus for use with a mobile power unit which includes a self-centering mechanism including sensing elements which contact the tobacco leaves without causing any damage to the leaves so that the price obtained for the tobacco is unaffected since it is largely determined by the condition of the leaf.

Still another object of the invention is the provision of a self-centering spraying apparatus of the above character in which the sensing elements for centering the spray nozzle over the top of the tobacco stalk also function as a wind shield in order to minimize loss of spray due to wind action as the spray descends from the spray nozzle to the plant foliage.

A further object of the invention is the provision of a spraying apparatus of the above character which is readily adapted for mounting on a boom to permit simultaneous spraying of a plurality of rows with precise registration of the spray nozzles over each row individually.

These and other objects are achieved by the provision of a self-centering spraying apparatus suspended for pivotal movement from the boom of a mobile spray unit and including oppositely disposed sensing elements mounted such that they simultaneously contact the leaves on opposite sides of a tobacco stalk as the spraying apparatus is driven down the row. A spray nozzle is mounted vertically above and intermediate the sensing elements such that lateral displacement of the sensing elements causes equivalent movement of the spray nozzle by means of a suitable linkage which positions the spray nozzle over the center of the tobacco stalk in order to assure that the sprayed chemical runs down the stalk to each leaf axil of the plant.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawings in which:

FIG. 2 is a rear elevation of the mechanism of the present invention illustrating the sensing elements and the associated linkage to position the spray nozzle over a tobacco plant. The view is taken looking forward from the rear of the mobile spray unit.

FIGS. 5 and 6 illustrate schematically the preferred linkage mechanism of the present invention as illustrated in greater detail in FIG. 2 and shows the mechanism in central and shifted positions.

FIGS. 7 and 8 illustrate schematically a modified form of linkage and a modified positioning of the sensing elements both in the central and shifted positions.

DESCRIPTION OF THE PREFERRED EMBODIMENT

Figure 1:
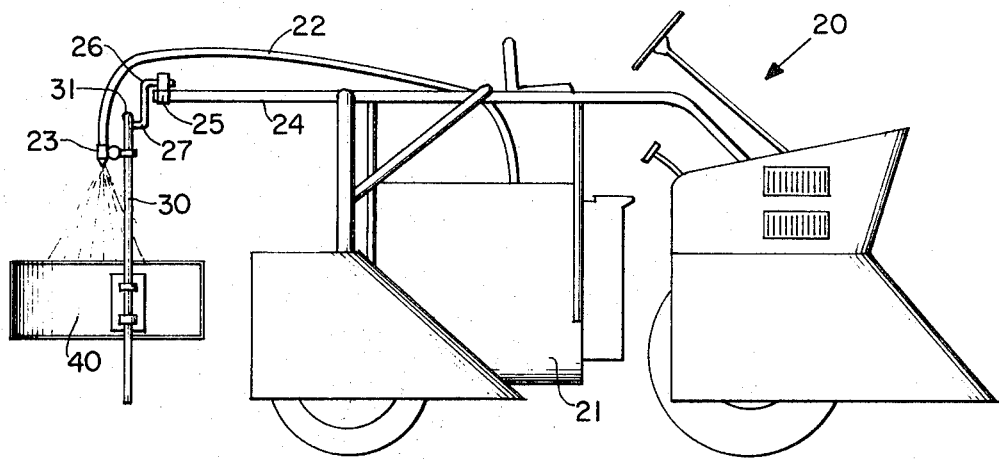
FIG. 1 is a side elevation of a mobile spray unit having the present invention suspended from its boom at the rearward portion thereof.

Referring to FIG. 1, the invention is illustrated in association with a conventional self-propelled mobil sprayer unit 20 which is well known to those in the agricultural field. The sprayer unit 20 includes a tank 21 which can be filled with the spray chemical and a pump (not shown) which carries the spray chemical by means of the flexible hose 22 to the spray nozzle 23 which is directed downwardly as illustrated. The mobile sprayer unit 20 also includes a framework 24 for supporting the boom 25 which is substantially horizontal and extends transversely behind the mobile sprayer unit 20.

A linkage mechanism is suspended from the boom for supporting the mechanism for sensing the tobacco leaves whereby the spray nozzle is centered over the top of the tobacco stalk. Referring to FIG. 2, the apparatus includes a bracket 26 clamped to the boom 25 and having a downwardly extending pivot extension 27 (see FIG. 1). The preferred structure of the supporting means includes a rigid framework comprising a cross member 28 and downwardly extending members 29 and 30. The cross member 28 is suspended and supported by the use of the pivot 31, comprising a bearing journalled to the pivot extension 27. This constitutes a preferred means for supporting the sensing elements which allows free pivotal movement of the linkage mechanism on the pivot extension 27 in response to lateral displacement forces exerted by the sensing elements to be hereinafter described.

The spray nozzle 23 is secured to the support member 32 which is suitably secured by the clamps 33 and 34 to the downwardly extending members 29 and 30, respectively.

Sensing means or elements in the form of large surfaces of curved configuration are secured to each of the downwardly extending members 29 and 30 as illustrated in FIG. 2. As better illustrated in FIG. 3, the sensing element 35 is of arcuate configuration and has a smooth curved surface 36 for contacting the leaves of the tobacco plant without causing any damage. Preferably the surface 36 has a principal radius of curvature the axis of which is substantially a straight line. The sensing element 35 is secured to the member 29 by means of the bracket 37. A co-acting sensing element 40 of similar configuration is preferably symmetrically mounted on the member 30.

Figure 3:
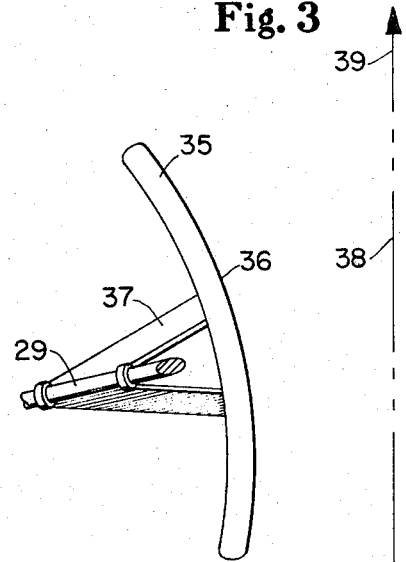
FIG. 3 is a fragmentary cross section taken on the line 3—3 of FIG. 2 illustrating the preferred contour of the sensing elements and its position in relation to the centerline of the crop row.

FIG. 3 illustrates the preferred mounting position of the sensing element 35 with respect to the center line 38 of the crop row. The direction of movement of the mobil sprayer unit 20 is indicated by the arrow 39. The sensing element 40 is similarly mounted so that the sensing elements 35 and 40 form a converging-diverging channel with respect to the tobacco plant 41 and its leaves 42.

Figure 13:
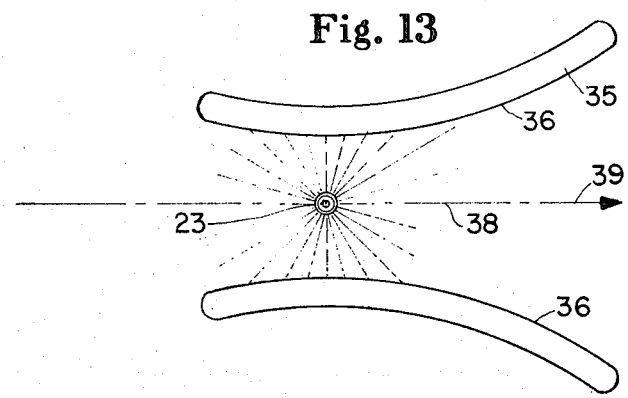
FIG. 13 is a schematic illustration of the preferred shape and mounting of the sensing elements to form a converging-diverging channel.

In the arrangement illustrated in FIGS. 2 and 3, it is preferred that the nozzle 23 be mounted at or near the throat of the converging-diverging channel formed by the curved surfaces of the sensing elements 35 and 40. This is shown schematically in FIG. 13. In addition, the surface 36 of the sensing element 35 is preferably mounted as illustrated in FIG. 2 with its surface tilted such that the axis of its radius of curvature is inclined downwardly and inwardly at an angle of about 30° with respect to the axis of the plant stalk. While this angle is not absolutely essential to the satisfactory use of the invention, it has been found to be preferable from the standpoint of obtaining the best results with a minimum of damage to the tobacco leaves. It will be understood, of course, that this angle can be varied because of changes in spraying conditions, crop foliage, etc.

The angular mounting of the sensing elements 35 and 40 also provides a wind shield for the spray in order to minimize loss of spray before it contacts the plant. This latter advantage will be realized by inspection of FIG. 2.

FIGS. 5 and 6 illustrate schematically the preferred form of linkage heretofor described in detail with respect to FIGS. 1, 2 and 3. As the mobile sprayer unit 20 is driven down the tobacco row, it will be apparent that the sensing elements 35 and 40 contact the leaves 42 of the tobacco plant 41 thereby controlling the lateral movement of the entire mechanism to center the spray nozzle 23 over the center of the plant. FIG. 5 illustrates the mechanism with the spray nozzle 23 essentially at its neutral position directly beneath the pivot 31 whereas FIG. 6 illustrates the displacement of the spray unit caused by a plant that is off center with respect to the center line of the row and illustrates the manner in which the nozzle 23 is shifted in order to obtain an effective spray over the top of the plant. It has been found that with this self-centering mechanism, the spray is very effectively placed over the top of each plant so that the liquid sprayed on the center of the plant runs down the stalk and is deposited at each of the leaf axils to effectively control and kill sucker growth.

Figure 4:
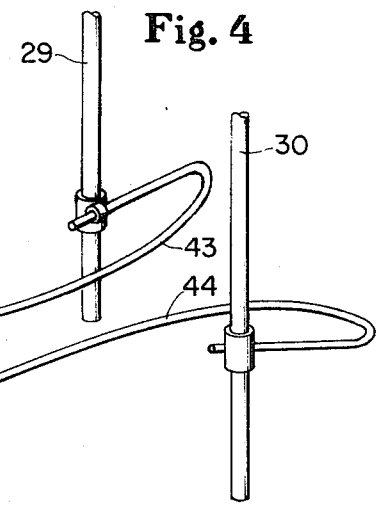
FIG. 4 is a perspective view of a modified form of sensing element that may be used under some circumstance in the practice of the present invention.

A modified form of sensing element is illustrated in FIG. 4. It consists simply of a pair of tubular sensing elements 43 and 44 mounted, respectively, on the downwardly extending members 29 and 30. With the use of this embodiment, the tubular sensing elements 43 and 44 contact the leaves to effectively pivot the spraying support apparatus and place the spray nozzle 23 over the center of the plant in much the same manner as that previously described with respect to the preferred embodiment.

FIGS. 7 through 12 illustrate other kinds of mechanisms and linkages that can be employed in the practice of the invention in order to centralize the spray over the center of the stalk. For example, FIG. 7 illustrates a linkage having pivots at 45, 46, 47 and 48.

It also illustrates the use of sensing elements 35 and 40 in a position wherein their vertical surface is parallel to the plant stalk. FIG. 8 illustrates the mechanism of FIG. 7 which has been displaced to the right due to a misaligned plant and illustrates the manner in which the spray nozzle would be shifted accordingly.

Figure 9:
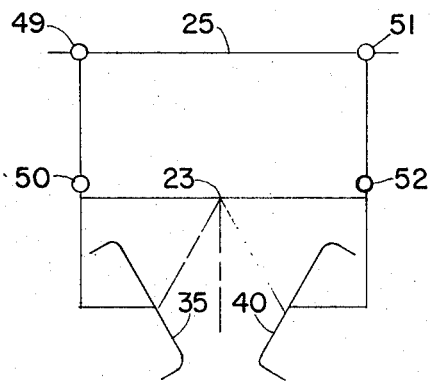
FIGS. 9 and 10 illustrate a further modified form of linkage that can be used in the practice of the invention.
Figure 10:
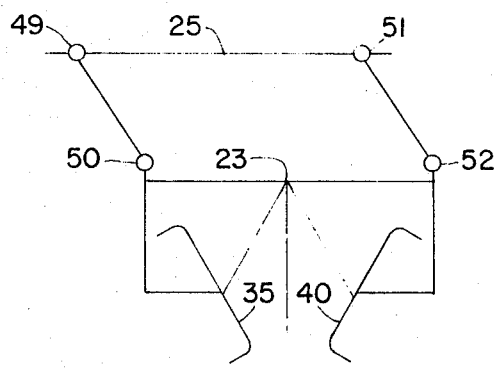

FIG. 9 illustrates still another mechanism wherein the pivots 49, 50, 51 and 52 are used to support the mechanism which includes a spray nozzle 23 and the sensing elements 35 and 40. FIG. 9 illustrates the position of the elements in their neutral or central position. FIG. 10 shows the same mechanism after it has been displaced to the right so that the spray nozzle 23 is moved over the center of a plant stalk.

Figure 11:
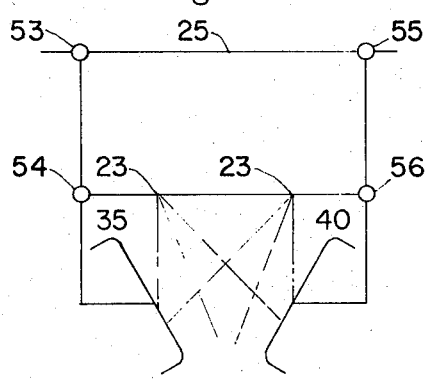
FIGS. 11 and 12 are another example, illustrated schematically, of a linkage mechanism for practicing the invention.
Figure 12:
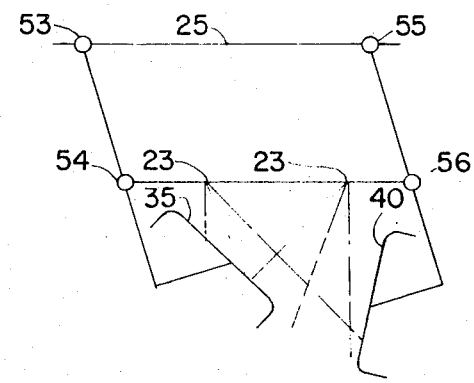

The use of a self-centering apparatus with two spray nozzles is illustrated in FIGS. 11 and 12. The spray nozzles 23 are angularly mounted and directed at the plant from opposite sides. The mechanism includes the pivots 53, 54, 55 and 56. FIG. 11 illustrates the linkage in a neutral position and FIG. 12 shows it displaced to the right by a misaligned plant to move the spray nozzles 23 over the center thereof. The linkage itself is somewhat like that previously described with respect to FIGS. 7 and 8, the only variation being the provision of two spray nozzles as aforesaid. It will be understood, of course, that two or more spray nozzles could be used with any of the embodiments previously described although one is preferred to minimize spray usage.

While the several embodiments of the invention have been described heretofor with respect to the use of a linkage system and spray nozzle including sensing elements for a single row, it is to be understood that one of the advantages of the invention is that a plurality of the self-centering spraying units can be mounted at spaced intervals along the boom 25 to coincide with the spacing of rows in a tobacco field. This permits simultaneous spraying of multiple rows of tobacco. The only limitation on the number of rows that can be simultaneously sprayed would be the length and strength of the boom 25 and it has been found that in some cases as many as eight rows can be sprayed simultaneously with each row having an individual self-centering spraying apparatus thereover to achieve optimum spraying results for the control of tobacco suckers with the use of a minimum of spray material.

The invention also has utility in the topping of tobacco plants by the use of a chemical spray, i.e. the removal or killing of the flower at the late button or early flower stage without harming the plant by using an appropriate spray directed on the button or flowers. The present apparatus in any of its forms is useful for this purpose. However, best topping results are obtained when using the apparatus as illustrated and described in FIGS. 1 and 2 and mounting a pair of tubular sensing elements 43 and 44 (FIG. 4) on the downwardly extending members 29 and 30, respectively, having the sensing elements 35 and 40 mounted thereon. In the latter arrangement, the tubular sensing element 43 would be mounted above the sensing element 35 and the tubular sensing element 44 would be mounted above the sensing element 40. The two tubular sensing elements 43 and 44 would contact the stalk near the top and just below the button or flowers to assure alignment and spray directly thereon.

Heretofor, the apparatus has been described primarily as a device for spraying tobacco for sucker control and for topping. There is no reason to limit the scope of the invention to such use. Therefore, it will be understood that the advantages and benefits of the invention can also be obtained in the spraying of any other nursery or agricultural products such as forest products, corn, soy beans, etc.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A self-centering spraying apparatus comprising:
   a. a pair of oppositely disposed sensing elements mounted in spaced relationship on a linkage mechanism adapted for attachment to a vehicle, said sensing elements having surfaces for making contact with leaves projecting from opposite sides of a plant stalk as the spraying apparatus is moved forward,
   b. means supporting said linkage mechanism, said means permitting lateral movement of said linkage mechanism in response to any shift in the relative lateral position of said sensing elements,
   c. at least one spray nozzle mounted on said linkage mechanism vertically above and intermediate said sensing elements such that lateral movement of said sensing elements is translated to said spray nozzle by said linkage mechanism whereby the spray nozzle is positioned centrally over a plant stalk in response to the lateral displacement of the sensing elements.

2. A self-centering spraying apparatus as claimed in claim 1 wherein each of said sensing elements comprises a smooth curved surface having a principal radius of curvature, the axis of which is substantially a straight line.

3. A self-centering spraying apparatus as claimed in claim 2 wherein said sensing elements are mounted such that their surfaces form a converging-diverging channel through which the plant passes and wherein said spray nozzle is mounted substantially over the throat of said converging-diverging channel.

4. A self-centering spraying apparatus as claimed in claim 3 wherein the surface of said sensing elements in a vertical plane are inclined downwardly and inwardly so that the axis of their principal radius of curvature is at an angle of about 30° with respect to the axis of the plant stalk.

5. A self-centering spraying apparatus as claimed in claim 2 wherein the surface of said sensing elements in a vertical plane are inclined downwardly and inwardly so that the axis of their principal radius of curvature is at an angle of about 30° with respect to the axis of the plant stalk.

6. A self-centering spraying apparatus as claimed in claim 1 wherein said sensing elements are mounted such that their surfaces form a converging-diverging channel through which the plant passes and wherein said spray nozzle is mounted substantially over the throat of said converging-diverging channel.

7. A self-centering spraying apparatus as claimed in claim 3 wherein the surface of said sensing elements in a vertical plane are inclined downwardly and inwardly so that the axis of their principal radius of curvature is at an angle of about 30° with respect to the axis of the plant stalk.

8. A self-centering spraying apparatus as claimed in claim 1 wherein the surface of said sensing elements in a vertical plane are inclined downwardly and inwardly so that the axis of their principal radius of curvature is at an angle of about 30° with respect to the axis of the plant stalk.

* * * * *

Dedication

3,683,547.—*Kendall L. Harden*, Anderson Township, Hamilton County, Ohio. SELF-CENTERING SPRAYING APPARATUS. Patent dated Aug. 15, 1972. Dedication filed May 2, 1975, by the assignee, *The Procter & Gamble Company*.

Hereby dedicates to the Public the entire term of said patent.

[*Official Gazette July 22, 1975.*]